April 19, 1949.                M. P. WINTHER ET AL                2,467,874
                                  CLUTCH CONTROL
                                Filed Nov. 7, 1946

Patented Apr. 19, 1949

2,467,874

UNITED STATES PATENT OFFICE 2,467,874

CLUTCH CONTROL

Martin P. Winther, Waukegan, Ill., and Stuart N. Senniger, Ladue, Mo., assignors to Martin P. Winther, as trustee Application November 7, 1946, Serial No. 708,422

12 Claims. (Cl. 172—284)

This invention relates to clutch controls and more particularly, to a control for an electric, eddy-current clutch.

Among the several objects of the invention may be noted the provision of a control for an electric, eddy-current clutch of an automotive vehicle adapted to facilitate the shifting of the gears of the speed changer of the vehicle transmission; the provision of a control of this class adapted to facilitate the action of the gear-synchronizing devices of the transmission; and the provision of a control of this class adapted to facilitate shifting into low or reverse gear when the automotive vehicle is at standstill. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

Figure 1:
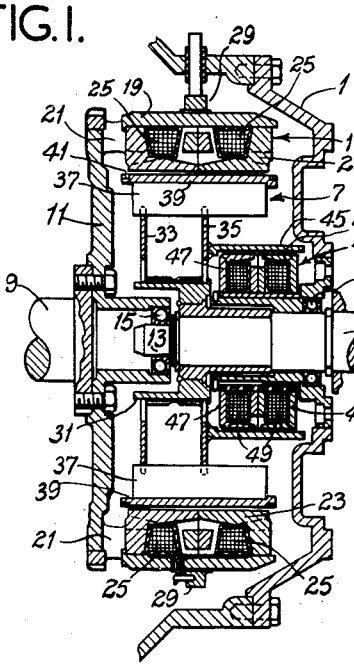
Figure 2:
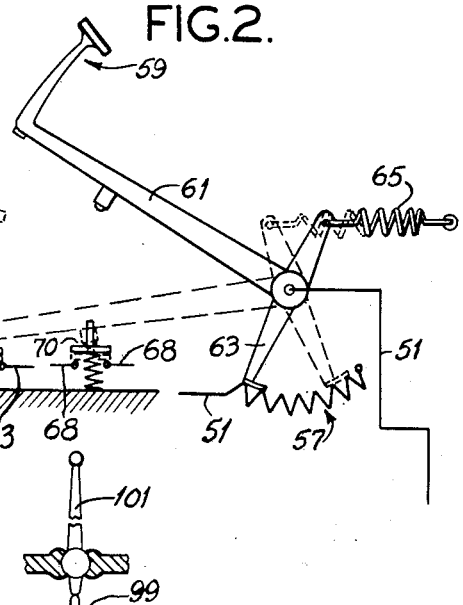
Figure 3:
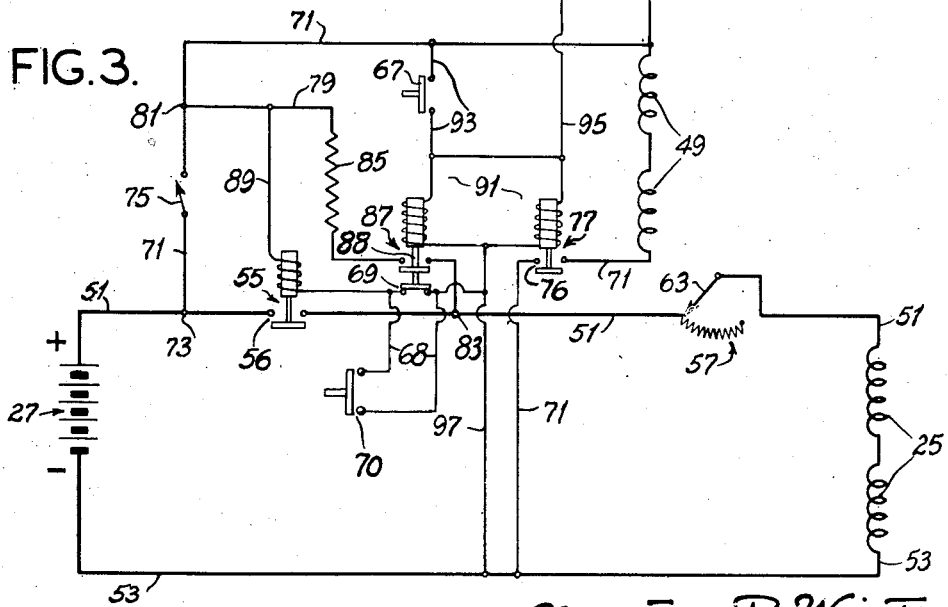
Figure 2:

In the accompanying drawings, in which one of various possible embodiments of the invention is illustrated, Fig. 1 is a longitudinal section of the eddy-current clutch which is controlled by the apparatus of this invention;

Fig. 2 is a view of an automotive clutch-operating pedal and certain switches and a resistance associated therewith; and, Fig. 3 is a wiring diagram of the control circuit for the clutch, also illustrating a gearshift lever and a switch associated therewith.

Similar reference characters indicate corresponding parts throughout the several views of the drawings.

The clutch control of this invention is particularly useful in an automotive vehicle provided with an eddy-current clutch of the type disclosed in the copending application of Martin P. Winther for Eddy-current coupling, Serial No. 693,057, filed August 26, 1946, issued as Patent 2,452,820, and a change-speed gear transmission embodying gear-synchronizing devices such as the well-known "Synchro-mesh" transmission. The gear-synchronizing devices are provided in such transmissions to equalize the speeds of the elements of the transmission to be meshed upon shifting of the gears. Such synchronizing devices usually include friction cone clutches which are engaged upon shifting of the gears to cause the elements to be meshed to rotate at nearly the same speed. When substantial synchronism of these elements is attained, they may be readily meshed. In conventional transmissions, only the intermediate and high-speed gears are synchronized. The low and reverse gears are not synchronized. This invention provides a novel control for an eddy-current clutch connected to such a transmission which is adapted to facilitate the action of the cone clutches of the gear synchronizers when shifting into intermediate and high gears, and also to facilitate shifting into low or reverse gear when the vehicle is at a standstill.

Referring now particularly to Fig. 1, there is shown an electric, eddy-current clutch of the type disclosed in said patent. Generally, the clutch includes a housing 1 wherein is journalled, by means of bearing 3, the end of a driven shaft 5. Fixed on the shaft 5 is the inductor member 7 of the clutch. Reference character 9 designates the crankshaft on an automotive vehicle. This shaft has a flywheel 11 bolted thereto and constitutes the drive shaft of the clutch, being connected to the prime mover of the vehicle. The reduced end 13 of the driven shaft 5 is journalled in a pilot bearing 15 in the flywheel. Carried by the flywheel surrounding the inductor member 7 is the annular field member, generally designated 17, of the eddy-current clutch. The driven shaft 5 is connected to the transmission (not shown) of the vehicle.

The field member 17 includes a drum 19 secured to posts 21 extending from the flywheel. Carried within this drum is an assembly of annular toothed pole-forming rings 23 and a winding consisting of two annular field coils 25. The details of this assembly are completely disclosed in said patent and since they do not form a part of this invention are not repeated here. Coils 25 are connected in series and are adapted to be energized from the battery 27 (Fig. 3) of the automotive vehicle through a slip-ring connection 29.

The inductor member 7 comprises a hub 31 keyed on the driven shaft 5 and carrying axially spaced plates 33 and 35. These plates support axially extending, thin flexible fins 37 which extend radially outward from the peripheries of the plate and carry inductor drum ring segments 39. These segments are spaced from the internal periphery of the field member 17 by an air gap 41. Further details of this inductor construction are disclosed in said patent and are not repeated here.

From the above it will be clear that when the field member 17, the driving element of the clutch, is rotated by the drive shaft 9 and its coils are energized to establish a flux field, the inductor 7, the driven element, will be inductively driven with slippage due to flux reactions caused by the eddy currents induced in segments 39.

The inductor 7 is adapted to be braked by means of an inductive eddy-current brake comprising a stationary braking field member 43 fixed to the clutch housing within a brake inductor drum 45 secured to the clutch inductor member 7. The braking field member 43 comprises an assembly of annular toothed rings 47 and a winding consisting of two annular field coils 49 in the manner disclosed in said patent. Coils 49 are connected in series and are adapted to be energized by the battery 27. When coils 49 are energized, the inductor member 7 of the clutch is inductively braked by eddy currents generated in the brake inductor 45.

As illustrated in Fig. 3, the clutch field coils 25 the connected in series in a power circuit including battery 27 and power lines 51 and 53. Line 51 includes the fixed contacts 56 of a relay 55, and a rheostat 57 which is under the control of the automotive clutch pedal 59 (Fig. 2). This pedal constitutes the clutch operating member of the apparatus and is movable between the normal raised position illustrated in solid lines in Fig. 2 to the depressed position illustrated in dotted lines. The lever 61 of the pedal carries the movable arm 63 of the rheostat and the arrangement is such that, when the clutch pedal is depressed, resistance is inserted in line 51. The clutch pedal is return-biased by a spring 65. Also under the control of the clutch pedal are switches 67 and 70. Switches 67 and 70 are normally open, but are closed by the clutch lever 61 upon depression thereof. If desired, both switches could be in a single unit. The function of these switches will appear.

The breaking field coils 49 are connected in the power circuit in a line 71 across power lines 51 and 53. Line 71 is connected to line 51 at connection 73 between the battery and relay 55 and includes a manually operable switch 75 and the fixed contacts 76 of a relay 77. Switch 75, for convenience in operation of the vehicle, is part of the ignition switch of the vehicle.

The contacts 56 of relay 55 are adapted to be shunted by a shunt circuit including a line 79 connected to line 71 at connection 81 and to line 51 at connection 83. Line 79 includes a limiting resistance 85 and the top contacts 88 of a shunt relay 87. The arrangement of contacts 56 is such that when either contacts 69 or switch 70 are closed, relay 55 will be energized, thus closing contacts 56 and shunting resistance 85. The clutch field winding circuit will then be completed through contacts 56. If, however, both switch 70 and contacts 69 are open, the clutch field winding circuit will be then completed through the shunt circuit including the resistance 85.

The coil of relay 55 is connected in a line 89 between lines 79 and 53 and includes either lower contacts 69 or pedal-operated switch 70. When switch 75 and either contacts 69 or switch 70 are closed, the circuit through the coil of relay 55 is completed to close the contacts 56 of relay 55 and thus to complete the main clutch coil circuit including power lines 51 and 53.

The coils of relays 77 and 87 are connected in parallel in a circuit 91 between lines 71 and 53. This parallel circuit includes lines 93 and 95 connected to lines 71 and also includes line 97 connected to line 53. Line 93 includes the pedal-operated switch 67. Line 95 includes a switch 99 controlled by the control member 101 for the automotive transmission.

Control member 101 is illustrated in Fig. 3 as the conventional gearshift lever of an automotive vehicle. It will be understood, however, that this member may be any link in the linkage for shifting the gears of the transmission of the vehicle. Control member 101 is illustrated in Fig. 3 in neutral position and is movable therefrom to any one of several transmission-engaging positions such as the conventional reverse, low, intermediate and high-gear positions. The arrangement of switch 99 and lever 101 is such that the switch closes when the shift lever is in neutral position and opens whenever the lever is moved out of neutral position to shift into any gear. The circuit is such that both relays 77 and 87 are energized when either of switches 67 and 99 is closed.

Operation is as follows:

It is assumed that the ignition switch 75 is closed and that the prime mover of the vehicle is driving the driving field member 17 of the clutch. Initially, the clutch pedal 59 is in its normal raised or retracted position, switches 67 and 69 being open. The rheostat arm 63 is in a position wherein the resistance of the rheostat 57 is removed from the clutch winding circuit. The transmission control member 101 is in neutral position and switch 99 is closed. Under these conditions, the coils of the relays 77 and 87 are energized and the coil of relay 55 is not energized, as the contacts 69 are opened by the energization of relay 87, and switch 70 is also open. Contacts 88, however, are closed.

With the contacts 56 of relay 55 open, a circuit is completed directly from the positive terminal of the battery 27 through line 51, line 71, switch 75, line 79, resistor 85, top contacts 88 of relay 87 to the arm 63 of the rheostat, thence through the coils 25 of the clutch windings and return line 53 to the negative terminal of the battery. Thus, a low value of current determined by the resistance of resistor 85 is supplied to the clutch windings 25. Since the contacts 76 of relay 77 are also closed, a circuit is also completed across lines 51 and 53 through line 71 including the brake windings 49. The low current through the clutch windings 25 energizes the clutch inductively to couple the clutch elements 17 and 7 in a partial driving relation. At the same time, the brake is energized to hold down the speed of the inductor member 7. The top contacts 88 of relay 87 are at this time closed, and the shunt circuit comprising line 79, limiting resistance 85, and said contacts 88 limits the current through the clutch windings 25.

Preparatory to starting the vehicle moving, the operator, as is usual, first depresses the clutch pedal 59 to the dotted-line position of Fig. 2. This closes switches 67 and 70 and inserts the resistance of rheostat 57 in line 51. With switch 70 closed, the coil of relay 55 is energized and its contacts 56 are closed. The coil of relay 87, however, is energized due to the switches 67 and 99 being closed. Although the top contacts 88 of relay 87 are closed, the shunt circuit 79 including resistor 85 is shunted by closed contacts 56. This completes a circuit as follows: from the positive terminal of the battery through line 51 to connection 73, through contacts 56, through line 51 and the now inserted resistance of rheostat 57, the arm 63, clutch windings 25, and through return line 53 to the negative terminal of the battery. With the resistance of rheostat 57 in this circuit, a low value of current is supplied to the clutch windings. If, as is preferable, the value of the complete resistance 57 equals that of 85, the low value of current supplied to clutch coils 25 is the same under these conditions as it was when resistance 85 was in the circuit. This low current energizes the clutch again inductively to couple the clutch elements in partial driving relation. At the same time, the brake winding 49 is energized inductively to brake the driven inductor member 7. The result is that upon depressing the clutch pedal, the driven element of the clutch still rotates only slowly. The design of the clutch and brake and the resistances 57 and 85 is such that the driven element 7 of the clutch is not brought to a stop but is rotated only slowly.

The operator then manipulates the gearshift lever 101 to shift the transmission into low or reverse gear as desired. Shifting of the gears is facilitated by the slow rotation of the driven clutch element 7 and shaft 5, since it facilitates meshing of the low or reverse gears of the transmission. If no means for slowing down the driven element of the clutch were provided, the gears of the transmission might clash. On the other hand, if the driven element of the clutch were positively completely stopped, as in some prior devices, the gears of the transmission might be stopped in out-of-mesh relation and it would be difficult to mesh them, particularly when in low gear during starting the vehicle from standstill.

After the gears of the transmission have been engaged by the control lever 101, the operator releases clutch pedal 59, which under the bias of spring 65 returns to its normal raised position. This reopens switches 67 and 70 and deenergizes relays 87 and 77 and gradually removes the resistance of rheostat 57 from the circuit of clutch winding 70. With contacts 69 closed, the circuit through the coil of relay 55 is maintained and contacts 56 remain closed to complete the circuit through clutch windings 25 for supplying the normal high current thereto. This effects normal driving relation of the driving field member 17 and the driven inductor member 7 of the clutch. Since control lever 101 is out of neutral, switch 99 is open. Switch 67 is also open. The coil of relay 77 is thus deenergized, and the brake field winding circuit is broken so that the brake is not applied. The driven element of the clutch is thus driven at full speed and transmits full torque.

To shift from low gear into intermediate gear or from intermediate gear to high gear, the procedure and operation are substantially the same as in shifting into low gear. When the clutch pedal is depressed prior to shifting, switches 67 and 70 are closed, relays 87, 77 and 55 are energized and the resistance of rheostat 57 is inserted in the circuit of the clutch windings 25. This supplies a low value of current to the clutch windings, as previously described. With switch 67 closed, relay 77 is energized to complete the circuit through the brake winding 49. This occurs even though switch 99 is now open because lines 93 and 95 are paralleled as regards the coil of relay 77. The brake is thus energized and the driven element 7 of the clutch and driven shaft rotate very slowly.

Gear-shifting operations are facilitated since, with the driven element of the clutch rotating very slowly, the usual mechanical gear-synchronizing devices of the transmission rapidly completely synchronize the speeds of the elements to be meshed. Another advantage is that the cone clutches of the gear-synchronizing devices are not unduly loaded and hence do not wear out rapidly.

Thus, the clutch control herein disclosed facilitates the shifting of the gears of the transmission of the automotive vehicle. It is particularly useful in small tow trucks driven by internal combustion engines wherein shifting is confined almost entirely to engaging the low and reverse gears of the transmission, since it provides for easy shifting into these gears.

While the clutch is herein disclosed as an eddy-current clutch, it will be understood that the principles of the control are applicable to any electric clutch and also to other types of clutches. It will also be understood that, while the driving and driven elements of the clutch are herein disclosed as the field and inductor members, respectively, this relation may be reversed. It is preferable, however, that the inductor member be the driven element since this member lends itself more readily to a low moment of inertia construction than the field member, and this is desirable in a clutch for an automotive vehicle.

While Fig. 3 disclosed a return line 53 to the negative terminal of the battery, it will be understood that the negative terminal of the battery, lines 89, 97 and 71, and coils 25 may be grounded for simplifying the construction. Such grounding is desirable so that only one slip-ring connection 29 is necessary.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. In apparatus of the class described, an electric clutch comprising driving and driven elements, means for energizing said clutch, a brake for said driven element, a clutch-operating member movable between two positions, a movable control member, means cooperatively controlled by said clutch-operating member and said movable control member adapted either to energize said clutch to drive the driven element at one speed or to partially energize said clutch and to apply the brake to said driven element to cause it to be driven at a lower speed.

2. In apparatus of the class described, an electric clutch for connecting a prime mover to a transmission having a control member movable from neutral to transmission-engaging positions, said clutch comprising driving and driven elements, means for energizing said clutch, a brake for said driven element, a clutch-operating member movable between two positions, means cooperatively controlled by said clutch-operating member and said movable control member adapted either to energize said clutch to drive the driven element at one speed, or partially to energize said clutch and apply the brake to said driven element to cause the driven element to be driven at a lower speed, and means controlled by said movable control member for applying said brake whenever said movable control member is in neutral position.

3. In apparatus of the class described, an eddy-current clutch comprising a field member and an inductor member, one of said members constituting the driven element of the clutch and the other the driving element, means for energizing said field member, a brake for said driven element, a clutch-operating member movable between two positions, a movable control member, and means cooperatively controlled by said clutch-operating member and said movable control member adapted either to energize said field member to drive the driven element at one speed, or partially to energize said field member and to apply the brake to said driven element to cause the driven member to be driven at a lower speed.

4. In apparatus of the class described, an eddy-current clutch for connecting a prime mover to a transmission having a transmission control member movable from neutral to transmission-engaging positions, said clutch comprising a field member and an inductor member, one of said members constituting the driving element of the clutch and the other the driven element, means for energizing said field member, a brake for the driven element, a clutch-operating member movable between two positions, means cooperatively controlled by said clutch-operating member and said movable transmission control member adapted either to energize said field member to drive the driven element at one speed, or partially to energize said field member and to apply the brake to said driven element to cause it to be driven at a lower speed, and means controlled by said transmission control member for applying said brake whenever said control member is in neutral position.

5. In apparatus of the class described, an eddy-current clutch comprising a field member and an inductor member, one of said members constituting the driving element of the clutch and the other the driven element, an inductive brake in inductive relation to said driven element, means for energizing said field member and said brake, a clutch-operating member movable between two positions, a movable control member, and means controlled by said clutch-operating member and said movable control member adapted either to energize said field member to drive the driven element at one speed or partially to energize said field member and normally to energize said brake, whereby said driven element is driven at a lower speed.

6. In apparatus of the class described, an eddy-current clutch for connecting a prime mover to a transmission having a control member movable from neutral to transmission-engaging positions, said clutch comprising a field member and an inductor member, one of said members constituting the driving element of the clutch and the other the driven element, an inductive brake in inductive relation to said driven element, means for electrically energizing said field member and said brake, a clutch-operating member movable between two positions, means cooperatively controlled by said clutch-operating member and said transmission control member adapted either to energize said field member to drive the driven element at one speed, or partially to energize said field member and normally to energize said brake, whereby said driven element is driven at a lower speed, and means controlled by said transmission control member for energizing said brake whenever said control member is in neutral position.

7. An eddy-current clutch comprising a driving field member and a driven inductor member, a brake operative on the inductor member, said field member including a winding connected in a power circuit, a clutch-operating member movable between two positions, a movable control member, means cooperatively controlled by said clutch-operating member and said control member adapted either to control said circuit to supply a normal value of current to said winding, or adapted to control said circuit to supply a lower value of current to said winding and also to apply said brake.

8. In apparatus of the class described, an eddy-current clutch for connecting a prime mover to a transmission having a control member movable from neutral to transmission-engaging positions, said clutch comprising a driving field member and a driven inductor member, a brake operative on the inductor member, said field member including a winding connected in a power circuit, a clutch-operating member movable between two positions, and means cooperatively controlled by said clutch-operating member and said transmission control member adapted either to control said circuit to supply a normal value of current to said winding, or to control said circuit to supply a lower value of current to said winding and also to supply said brake, and means controlled by said transmission control member for applying said brake whenever said control member is in neutral position.

9. An eddy-current clutch comprising a driving field member and a driven inductor member, an inductive brake in inductive relation to said inductor member, said field member and said brake each including a winding, said windings being connected in a power circuit, a clutch-operating member movable between two positions, a movable control member, and means cooperatively controlled by said clutch-operating member and said movable control member adapted either to control said circuit to supply a normal value of current to said field winding or to control said circuit to supply a lower value of current to said field winding and also to supply current to said brake winding.

10. In apparatus of the class described, an eddy-current clutch for connecting a prime mover to a transmission having a control member movable from neutral to transmission-engaging positions, said clutch comprising a driving field member and a driven inductor member, an inductive brake in inductive relation to said inductor member, said field member and said brake each including a winding, said windings being connected in a power circuit, a clutch-operating member movable between two positions, means cooperatively controlled by said clutch-operating member and said transmission control member adapted either to control said circuit to supply a normal value of current to said field winding or to control said circuit to supply a lower value of current to said field winding and also to control said circuit to supply current to said brake winding, and means controlled by said transmission control member for controlling said circuit to supply current to said brake winding whenever said control member is in neutral position.

11. In apparatus of the class described, an eddy-current clutch for connecting a prime mover to a transmission having a control member movable from neutral to transmission-engaging positions, said clutch comprising a driving field member and a driven inductor member, a winding in the field member of said clutch, an eddy-current brake for said inductor member, a winding in said brake, a power circuit for said clutch and brake windings, a clutch-operating member movable between two positions, switch means in said power circuit cooperatively controlled by said clutch-operating member and said transmission control member adapted either to control said circuit to supply a normal value of current to said clutch winding, or to control said circuit to supply a lower value of current to said clutch winding and also to supply current to said brake winding, and additional switch means in said circuit controlled by said transmission control member to control said circuit to supply current to said brake winding whenever the control member is in neutral position.

12. In a clutch and gear-shifting mechanism, an electric clutch having a driving and a driven element and a clutch field winding, an electric brake operative upon the driven member and having a brake field winding, a clutch control member movable between an initial and a moved position, a gearshift control member movable from a neutral to a gear-engaging position, a circuit connected for energizing the clutch and brake field windings, a fixed resistance and a variable resistance in said circuit adapted alternatively to be inserted in series with the clutch field winding, switch elements in the circuit operative by said clutch control member and gearshift control member so that the clutch field is energized through the fixed resistance when the clutch control member is in its initial position and the brake field winding is energized when the shift control member is in its neutral position, and so that the clutch member is energized only through the variable resistance when the clutch control member is in its moved position and in any position of the gearshift control member, apparatus adapted progressively to remove said variable resistance from the clutch field circuit upon return of the clutch control member to its initial position and adapted to deenergize the brake field circuit when the shift control member is moved from its neutral position.

MARTIN P. WINTHER.
STUART N. SENNIGER.

REFERENCES CITED

The following references are of record in the file of this patent:

UNITED STATES PATENTS

| Number | Name | Date |
| --- | --- | --- |
| 744,423 | Steckel | Nov. 17, 1903 |
| 1,784,354 | Hausmann | Dec. 9, 1930 |
| 1,820,961 | Church | Sept. 1, 1931 |
| 2,149,873 | Shapiro | Mar. 7, 1939 |
| 2,156,118 | Kliesrath | Apr. 25, 1939 |